United States Patent [19]

Hurn et al.

[11] Patent Number: 4,716,352

[45] Date of Patent: Dec. 29, 1987

[54] CHARGING BASE FOR A BATTERY-POWERED APPLIANCE

[75] Inventors: Richard L. Hurn, Ridgely; Michael R. Sell, Denton, both of Md.

[73] Assignee: Black & Decker, Inc., Newark, Del.

[21] Appl. No.: 686,590

[22] Filed: Dec. 26, 1984

[51] Int. Cl.$^4$ .......................................... H01M 45/04
[52] U.S. Cl. ......................................... 320/2; 320/15
[58] Field of Search ...................... 320/2, 15; 429/1, 7, 429/99, 100

[56] References Cited

U.S. PATENT DOCUMENTS

| | | | |
|---|---|---|---|
| 3,696,283 | 10/1972 | Ackley, III | 320/2 |
| 4,096,428 | 6/1978 | Hanson et al. | 320/2 |
| 4,225,814 | 9/1980 | Gantz et al. | 320/2 |

OTHER PUBLICATIONS pp. 5—5, Nickel-Cadmium Battery, Application Engineering Handbook, Second Edition.

*Primary Examiner*—R. J. Hickey
*Attorney, Agent, or Firm*—Finnegan, Henderson, Farabow, Garrett & Dunner

[57] ABSTRACT

The invention is directed to an electrical charging base for a battery-powered appliance having an electrical charging contact and includes a frame defining a shaped cavity for receiving an appliance in only one orientation, a rectifying circuit disposed in the frame for converting source alternating current to charging direct current, the rectifying circuit including a charging output contact disposed for electrical connection to the charging contact of an appliance when disposed in the cavity and a source input contact for electrical connection to an electrical source. A bypass circuit is disposed in the frame for electrically connecting the source input contact to a source output contact. The invention further comprises a jumper for electrically connecting the source output contact of one charging base to the source input contact of a second charging base.

7 Claims, 10 Drawing Figures

FIG. 3A
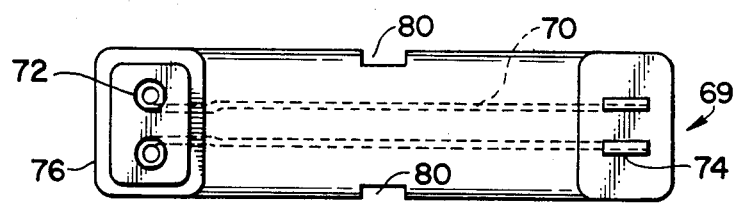
FIG. 3B
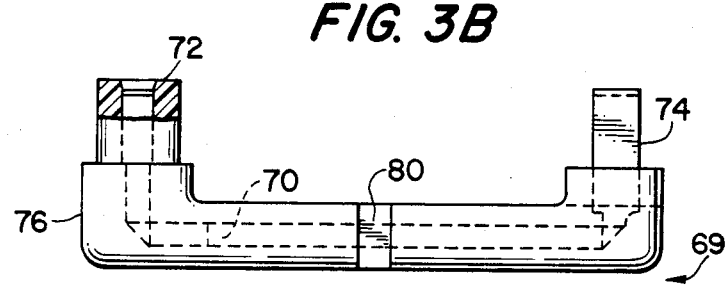
FIG. 3C
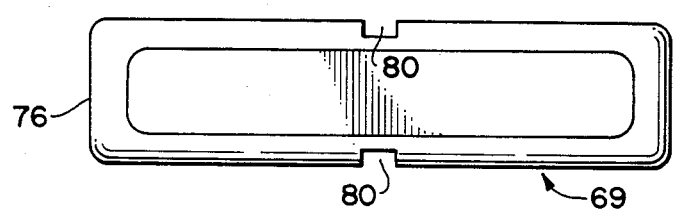
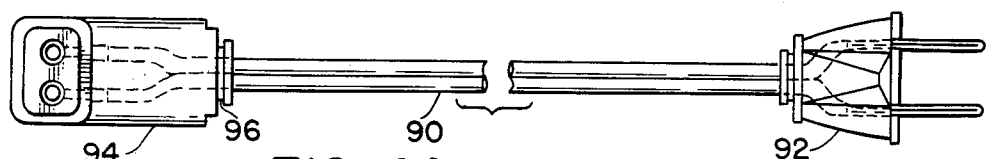
FIG. 4A
FIG. 4B
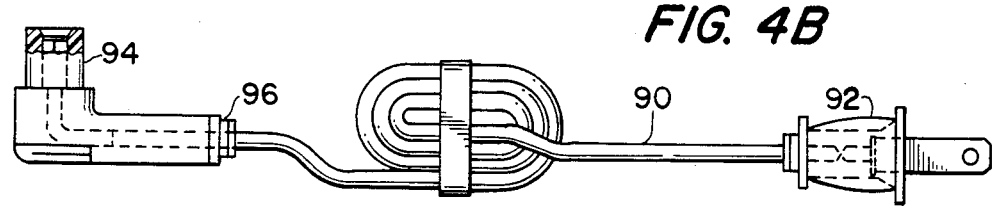

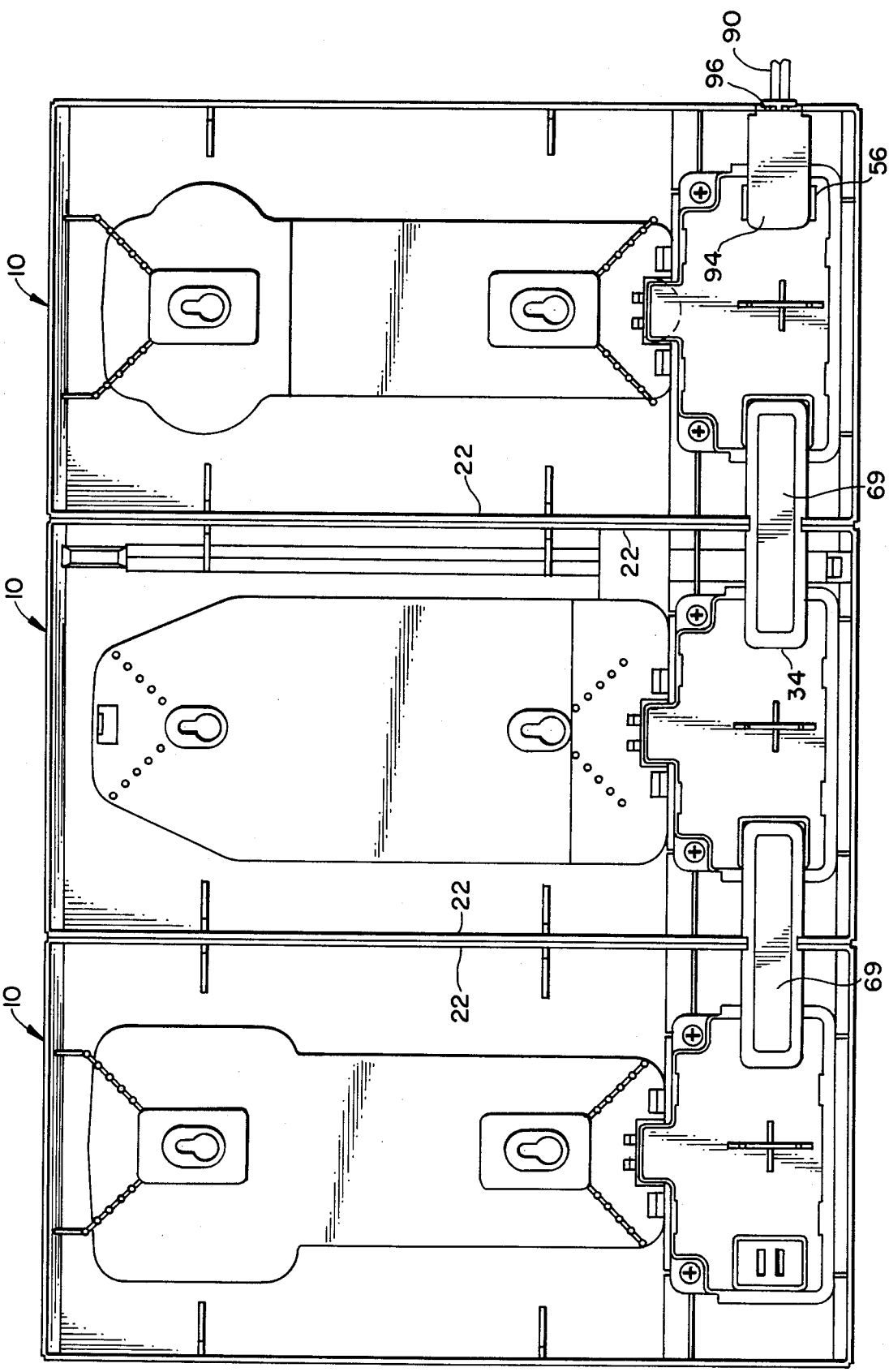

CHARGING BASE FOR A BATTERY-POWERED APPLIANCE

BACKGROUND OF THE INVENTION

1. Field of the Invention

This invention relates to charging bases for battery-powered appliances and, in particular, charging bases with the capability of being electrically connected in series.

2. Description of Related Art

Recent developments have made household appliances powered by rechargeable batteries practical. Each of these appliances, such as a small vacuum, a scrub brush, a shoe polisher, and various lights, has an individual charging base. The charging base is designed to hold the appliance in a convenient position, frequently mounted on a wall, and simultaneously to charge the battery through a charging circuit in the base. Each such base must be electrically connected to a household electric socket.

The necessity for an individual wall socket for each charging base originally did not present a problem. As the number of such appliances increases, however, the limited number of available household sockets presents a disadvantage to use of several such appliances. This is particularly the situation where several such appliances, such as kitchen appliances, are intended for use in the same general location.

The present invention overcomes this disadvantage of known rechargeable appliances by providing a charging base capable of being electrically connected in series with other such bases. The invention permits placement of an array of such appliances in one location while requiring only one electric wall socket.

Additional advantages of the invention are set forth in part in the description which follows, and in part will be obvious from the description, or may be learned by practice of the invention.

SUMMARY OF THE INVENTION

The objects and advantages of the invention may be realized and attained by means of the instrumentalities and combinations particularly pointed out in the appended claims.

The invention is directed to an electrical charging base for a battery-powered appliance having an electrical charging contact, the base comprising a frame defining a shaped cavity for receiving the appliance in only one orientation; a rectifying circuit disposed in the frame for converting source alternating current to charging direct current, the rectifying circuit including a source input contact and a charging output contact, the charging output contact being disposed for electrical connection with the charging contact of the appliance when the appliance is disposed in the cavity; a source output contact disposed in the frame; and a bypass circuit disposed in the frame for electrically connecting the source input contact with source output contact.

Preferably, the invention includes jumper means for electrically connecting the source output contact to a source input contact of a second charging base for another appliance.

The jumper means is preferably an electrical conduit having contacts at each end, the contacts being respectively complementary to the source output contact of one base and the source input contact of a second base.

It is preferred that the jumper means also include means for fixing together the frames of two adjacent charging bases.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIGS. 3A, 3B and 3C are plan views of the front, side and back of the jumper conduit.

FIGS. 4A and 4B are plan views of the front and side of the conduit connecting the charging base of the invention to a wall socket.

FIG. 5 is a plan view of the bottom surface of three charging bases for different appliances interconnected by jumpers.

DESCRIPTION OF THE PREFERRED EMBODIMENT

Reference will now be made in detail to the present preferred embodiments of the invention, examples of which are illustrated in the accompanying drawings.

Figure 1A:
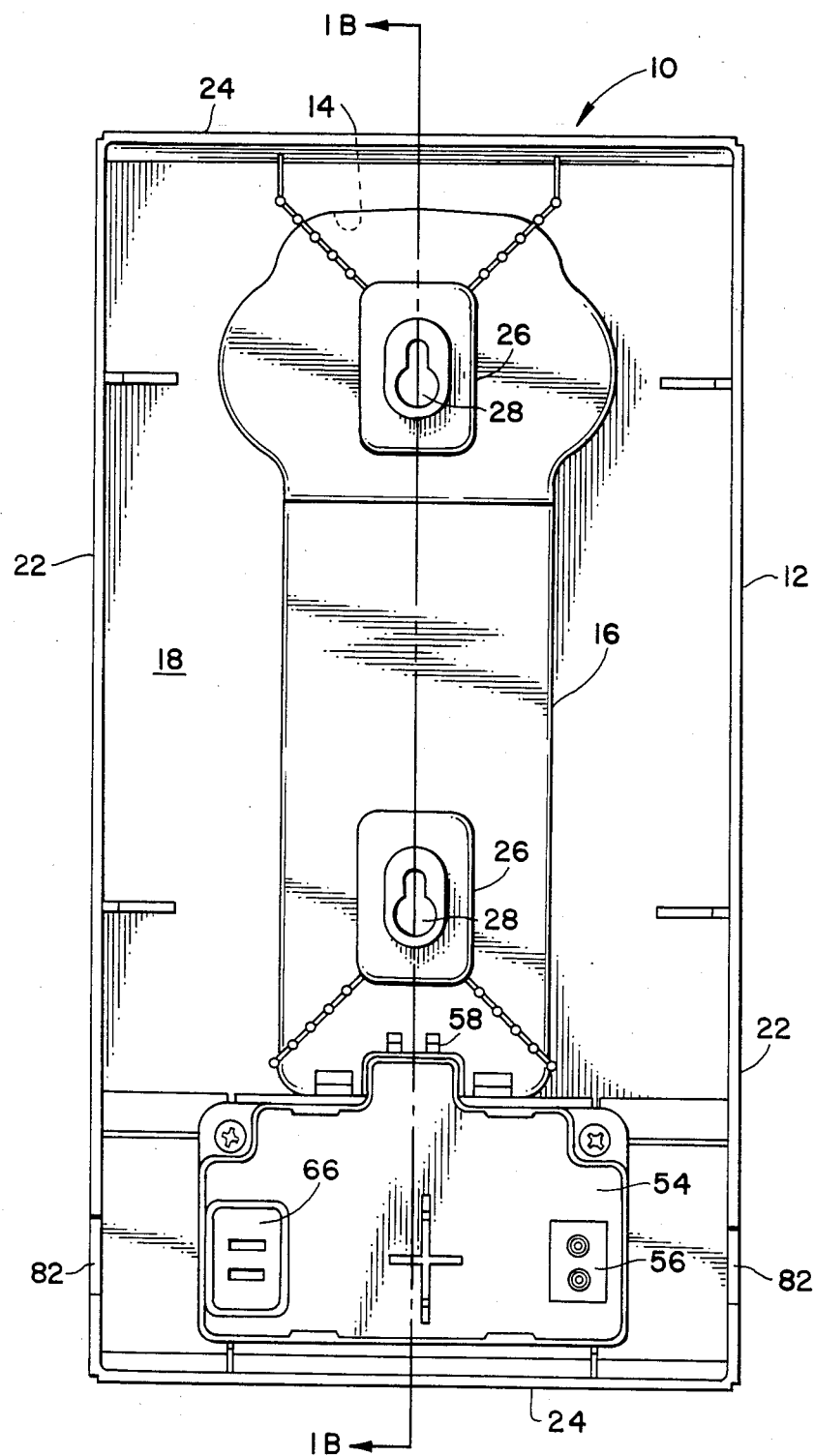
FIG. 1A is a plan view of the bottom of a charging base of the invention.

In accordance with the invention, an electrical charging base for a battery-powered appliance which has an electrical charging contact, comprises a frame defining a shaped cavity for receiving the appliance in only one orientation. In the preferred embodiment, as depicted in FIG. 1A, the base 10 comprises a frame 12 defining a shaped cavity for receiving an appliance in only one orientation. FIG. 1A depicts the bottom surface of frame 12, the shaped cavity is open to the top surface of frame 12. The view on the bottom surface indicates the shape of cavity 14 by means of the projection 16 created when forming the cavity in the plastic base. A cross-sectional view of a portion of the cavity may be seen in FIG. 1B.

Preferably the frame comprises a back 18 and a front 20 defined by opposed side walls 22 and opposed end walls 24. The side and end walls define the plane of and a substantially rectangular perimeter for back 18. The frame may include a pair of projections 26 in the back thereof spaced along its center line, each having an opening 28 permitting attachment of frame 12 to a vertical surface. Projections 26 preferably do not project beyond the plane defined by the side and end walls.

Cavity 14 is so shaped in frame 12 so as to receive an appliance in only one orientation. As seen in FIG. 5, charging bases for different appliances have different shaped cavities, each designed to receive its respective appliance in only one orientation.

Figure 2:
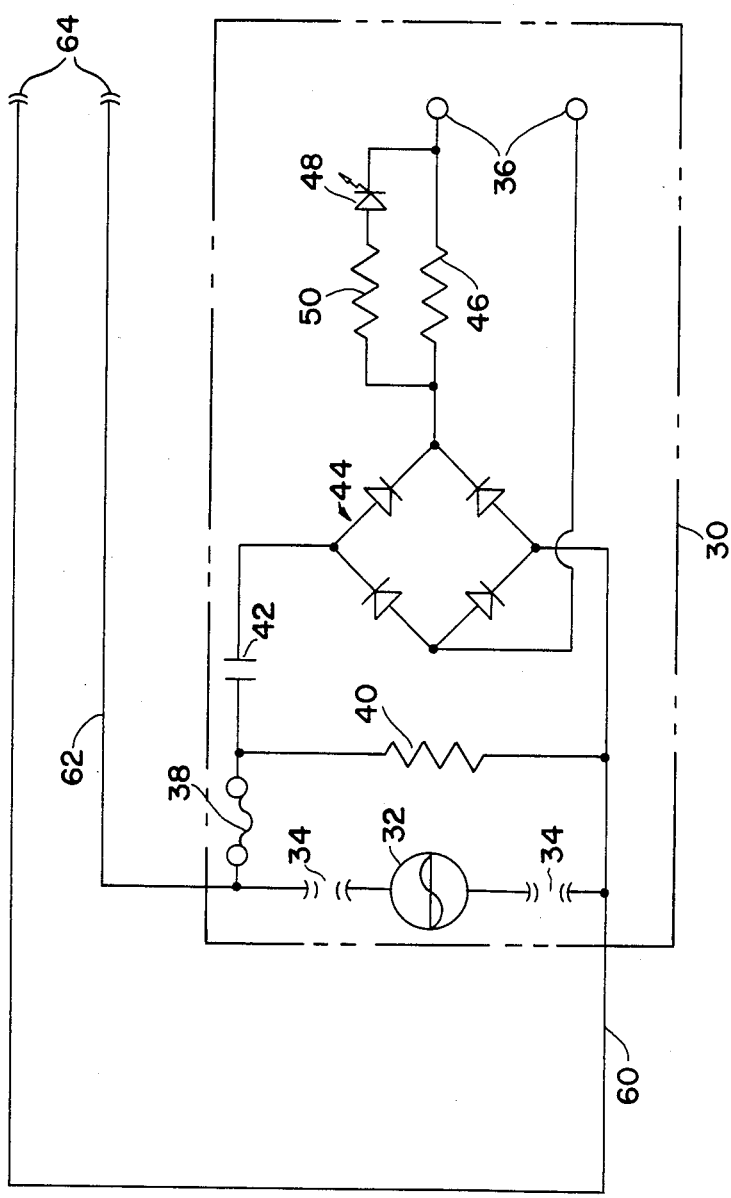
FIG. 2 is a circuit diagram representing the rectifying and bypass circuits.

In accordance with the invention, the charging base includes a rectifying circuit disposed in the frame for converting source alternating current to charging direct current, the rectifying circuit including a source input contact and a charging output contact and the charging output contact being disposed for electrical connection with the charging contact of the appliance when the appliance is disposed in the cavity. As seen in FIG. 2, the rectifying circuit 30 converts source alternating current 32 received by source input contact 34 to charging direct current available at charging output contact 36. Between source input contact 34 and charging output contact 36, the circuit includes fuse 38, an RC filter comprising resistor 40 and capacitor 42, a full wave bridge rectifier 44 and a load matching resistor 46. In parallel to load matching resistor 46 is a light emitting diode 48 in series with a current limiting resistor 50. In a preferred embodiment, where source alternating current is 120 VAC, fuse 38 is 0.25A, the RC filter includes resistor 40 of 68Ω and capacitor 42 of 3.3μF, full wave bridge rectifier 44 includes four 1N4004 diodes, load matching resistor 46 is 18Ω and current limiting resistor 50 is 200Ω. Naturally, depending on the appliance battery being charged and the source current, various changes to the rectifying circuit may be made as known by those skilled in the art.

Figure 1B:
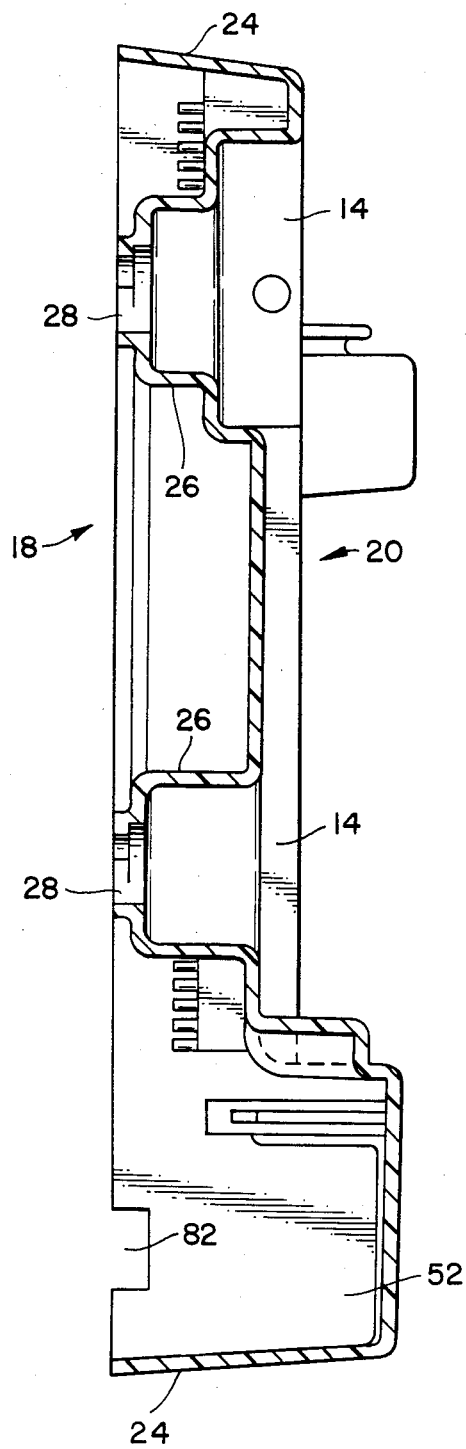
FIG. 1B is a partial cross-sectional view taken along line 1A—1A of FIG. 1.

Referring to FIGS. 1A and 1B, the rectifying circuit 30 is disposed in a cavity 52 in the bottom of frame 12. A cover 54 is placed over cavity 52 enclosing the rectifier circuit in frame 12. Source input contact 34 of circuit 30 is connected to a first male contact 56 in plate 54 covering the circuit disposed in cavity 52. Charging output contact 36 is connected to a second male contact 58 disposed for electrical connection with the charging contact of the appliance when the appliance is disposed into cavity 14. Preferably, second male contact 58 protrudes into one end of cavity 14.

In accordance with the invention, the charging base also includes a source output contact disposed in the frame and a bypass circuit disposed in the frame for electrically connecting the source input contact to the source output contact. As embodied herein and depicted in FIGS. 1A and 2, electrical conductors 60 and 62 are in electrical contact at one end thereof with rectifier circuit 30 in parallel with source input contact 34. The other end of conductors 60, 62 terminate in source output contact 64. First female contact 66 in cover 54 enclosing circuit 30 within frame 12 is electrically connected to source output contact 64. By this arrangement, source current is conveyed simultaneously through rectifier circuit 30 to charging output contact 36 and through conductors 60, 62 constituting a bypass circuit to source output contact 64.

The invention preferably includes jumper means for electrically connecting the source output contact to a source input contact of a second charging base for another appliance. As depicted in FIGS. 3A, 3B and 3C, a preferred embodiment of the jumper means is a jumper 69 including an electrical conductor 70 having a female contact 72 at one end complementary to first male contact 56 comprising source input contact 34 and having a male contact 74 at the other end complementary to a female contact on a second charging base comprising a source output contact. In a preferred embodiment, electrical conductor 70 and its respective terminal contacts 72, 74 are secured within a rigid frame 76 having a predetermined length to permit interconnection of adjacent charging bases having contiguous side walls 22 as depicted in FIG. 5.

It is also preferred that the jumper means include means for fixing together the frame of the charging base and the frame of the second charging base. As seen in FIG. 3A, 3B and 3C, the rigid frame 76 of jumper 69 includes opposed notches 80 disposed to engage complementary notches 82 in side walls 22 of frames 12. Thus, as seen in FIG. 5, adjacent charging bases may be secured together by the cooperation of the notches 80 in frame 76 of jumper 69 and notches 82 in the contiguous side walls 22 of adjacent frames 12.

Preferably, frame 76 and contacts 72, 74 have dimensions such that the outside surface of a rigid frame 76 of jumper 69 is coplanar with the plane of back 18 defined by the perimeter side and end walls 22, 24 of adjacent interconnected frames 12.

Figure 6:
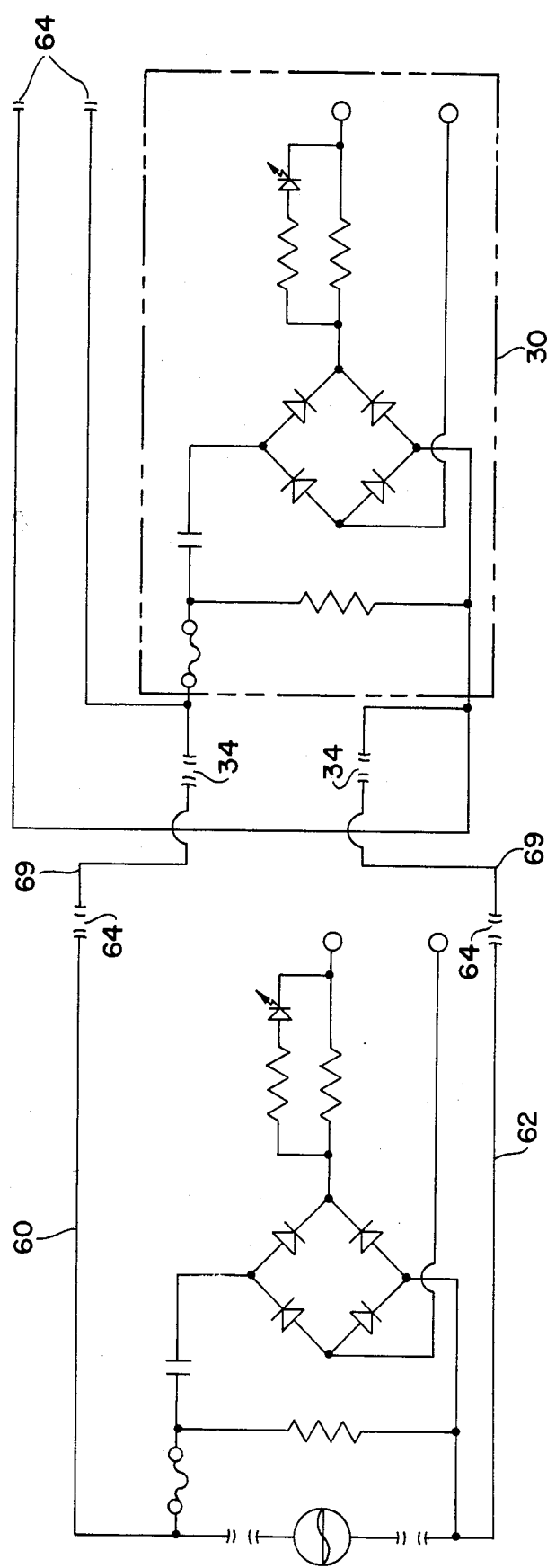
FIG. 6 is a circuit diagram depicting the electrical circuit of two interconnected charging bases.

By using jumpers 69, a plurality of charging bases 10 may be arranged in an interconnected array as seen in FIG. 5. Referring to FIG. 6, jumper 69 electrically interconnects conductors 60, 62 constituting a bypass circuit of one base to source input contact 34 of an adjacent base thereby providing source alternating current to a rectifier circuit 30 and to source output contact 64 of the adjacent charging base.

The charging base preferably includes a conduit for electrically connecting the alternating current source to the source input contact. As seen in FIG. 5, conduit 90 is electrically connected to first female contact 56 comprising source input contact 34 and is connected at the other end to a standard household wall socket. As seen in FIGS. 4A and 4B, conduit 90 has a standard plug 92 on one end and a female plug 94 at the other end for mating with male contact 56 in one of the charging bases. Plug 94 has a groove 56 disposed for engaging notch 82 in side wall 22 of frame 12. Plug 94 is so sized as to be coplanar with the plane of back 18 when mated with male contact 56.

It will be apparent to those skilled in the art that various modifications and variations may be made to the charging base of the invention without departing from the scope or spirft of the invention.

What is claimed is:

1. An electrical charging base for a battery-powered appliance having an electrical charging contact, said base comprising:
    (a) a frame defining a shaped cavity for receiving said appliance in only one orientation;
    (b) a rectifying circuit disposed in said frame for converting source alternating current to charging direct current, said source alternating current originating from a source outside of said charging base, said rectifying circuit including a source input contact and a charging output contact, said charging output contact being disposed for electrical connection with said charging contact when said appliance is disposed in said cavity;
    (c) a source output contact disposed in said frame;
    (d) a bypass circuit disposed in said frame for electrically connecting said source input contact to said source output contact, said bypass circuit transmitting source unaltered AC current from said source input contact to said source output contact; and
    (e) jumper means for electrically connecting said source output contact to a source input contact of a second charging base for another appliance.

2. The charging base of claim 1 wherein said source input contact is a first male contact, said charging output contact is a second male contact, and said source output contact is a first female contact.

3. The charging base of claim 1 wherein said jumper means includes means for fixing together said frame and the frame of said second charging base.

4. An array of charging bases for a plurality of battery-powered appliances, each appliance having an electrical charging contact, the array comprising:
  (a) a plurality of frames each having a top and a bottom defined by end and side surfaces, said frames being disposed in side-adjacent relation and each frame having a shaped cavity in its top for receiving one of said appliances in only one orientation:
  (b) a rectifying circuit disposed in the bottom of each said frame for individually converting in each said frame source alternating current to charging direct current, each said rectifying circuit including a source input contact and a charging output contact, each said charging output contact being disposed in its respective frame for electrical connection with the charging contact of the appliance disposed in said cavity;
  (c) a source output contact disposed in each said frame;
  (d) a bypass circuit disposed in each said frame for electrically connecting the respective source input contact to the respective source output contact, the bypass circuit of each said frame transmitting unaltered AC source current from said source input contact to the respective source output contact; and
  (e) jumper means for electrically connecting the source output contact of one said frame to the source input contact of an adjacent frame.

5. The array of claim 4 wherein said jumper means includes means for securing together contiguous sides of said adjacent frames.

6. The array of claim 4 wherein said bypass circuit disposed in each said frame bypasses the respective rectifying circuit in each said frame.

7. An electrical charging base for a battery-powered appliance having an electrical charging contact, said base comprising:
  a frame defining a shaped cavity for receiving said appliance in only one orientation;
  a rectifying circuit disposed in said frame for converting source alternating current to charging direct current, said rectifying circuit including a source input first male contact and a charging output second male contact, said second male contact being disposed for electrical connection with said charging contact when said appliance is disposed in said cavity;
  a source output first female contact disposed in said frame;
  a bypass circuit disposed in said frame for electrically connecting said source input contact to said source output contact; and
  jumper means for electrically connecting said source output female contact to a source input male contact of a second charging base for another appliance, said jumper means including an electrical conductor having a third male contact complimentary to said first female contact at one end and a second female contact complimentary to said input male contact on said second charging base at the other end.

* * * * *